United States Patent
Pohlan

(10) Patent No.: US 11,003,598 B2
(45) Date of Patent: May 11, 2021

(54) DATA CONTAINER FOR A CONTROL SYSTEM OF A TECHNICAL INSTALLATION

(71) Applicant: Siemens Aktiengesellschaft, Munich (DE)

(72) Inventor: Rudolf Pohlan, Waldbronn (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/713,304

(22) Filed: Dec. 13, 2019

(65) Prior Publication Data

US 2020/0192828 A1 Jun. 18, 2020

(30) Foreign Application Priority Data

Dec. 17, 2018 (EP) .................................... 18213182

(51) Int. Cl.
  *G06F 13/12* (2006.01)
  *G06F 13/20* (2006.01)
  *G05B 19/042* (2006.01)

(52) U.S. Cl.
  CPC ....... *G06F 13/122* (2013.01); *G05B 19/0423* (2013.01); *G06F 13/20* (2013.01)

(58) Field of Classification Search
  CPC ...... G06F 13/102; G06F 13/122; G06F 13/20; G05B 19/041; G05B 19/0423; G05B 19/0426; G05B 19/414; G05B 19/4155
  See application file for complete search history.

(56) References Cited

U.S. PATENT DOCUMENTS

| | | | | |
|---|---|---|---|---|
| 5,841,654 A | * | 11/1998 | Verissimo | G05B 19/0426 700/83 |
| 6,028,998 A | * | 2/2000 | Gloudeman | G05B 15/02 717/108 |
| 6,560,235 B1 | * | 5/2003 | Jones | G05B 19/0423 370/401 |
| 8,050,801 B2 | * | 11/2011 | Richards | G05B 15/02 700/276 |
| 2003/0158615 A1 | * | 8/2003 | Weber | G05B 15/02 700/96 |
| 2007/0157149 A1 | | 7/2007 | Grzonka et al. | |
| 2010/0042376 A1 | * | 2/2010 | Weatherhead | G05B 19/409 703/1 |
| 2010/0083232 A1 | * | 4/2010 | Chouinard | G06F 21/10 717/124 |
| 2011/0022827 A1 | * | 1/2011 | Plache | G05B 19/0426 713/1 |
| 2012/0079461 A1 | * | 3/2012 | Copass | G05B 19/41845 717/136 |

(Continued)

FOREIGN PATENT DOCUMENTS

| | | |
|---|---|---|
| DE | 102016119320 | 4/2018 |
| EP | 2575034 | 4/2013 |

OTHER PUBLICATIONS

EP Search Report dated Jul. 4, 2019 based on EP18213182.1 filed Dec. 17, 2018.

*Primary Examiner* — Thomas J. Cleary
(74) *Attorney, Agent, or Firm* — Cozen O'Connor

(57) ABSTRACT

A technical installation having at least one measurement point, wherein the measurement point has a plurality of IO signals, to which in each case a data container is assigned in a control system of the technical installation.

4 Claims, 4 Drawing Sheets

(56) References Cited

U.S. PATENT DOCUMENTS

| | | | |
|---|---|---|---|
| 2014/0067091 A1* | 3/2014 | Vishwanath | G05B 19/0426 700/83 |
| 2014/0257529 A1* | 9/2014 | Dicaire | G05B 23/0267 700/79 |
| 2015/0066162 A1* | 3/2015 | Hokeness | G05B 19/0426 700/28 |
| 2015/0095788 A1* | 4/2015 | Thiele | G06F 9/45558 715/735 |
| 2015/0233790 A1* | 8/2015 | Ratilla | G05B 19/0426 702/188 |
| 2016/0216706 A1* | 7/2016 | Christensen | G05B 19/042 |
| 2017/0371325 A1* | 12/2017 | Kodama | G05B 19/41875 |
| 2018/0101501 A1 | 4/2018 | Fischer et al. | |
| 2018/0117765 A1 | 5/2018 | Inaba | |
| 2018/0224832 A1 | 8/2018 | Jundt et al. | |
| 2018/0348725 A1* | 12/2018 | Baret | G05B 19/0426 |

* cited by examiner

DATA CONTAINER FOR A CONTROL SYSTEM OF A TECHNICAL INSTALLATION

BACKGROUND OF THE INVENTION

1. Field of the Invention

The invention relates to a control system for controlling a technical installation, a data container for an IO signal for integration into a control system of a technical installation, a technical installation having at least one measurement point, wherein the measurement point has a plurality of IO signals, and to a method for controlling the technical installation via the control system.

2. Description of the Related Art

In automation engineering, ready-made software modules are also used for programming automation devices used therein and for describing the configuration for the industrial installation to be automated (together referred to below as the automation solution). So-called "function blocks" can be cited as examples of these software modules. As is known, this relates to a combination of a software functionality, e.g., a controller functionality, with "local data", with which the respective functionality works. However, entire automation plans and templates for the descriptions of individual control units and descriptions for a subsystem, etc. are also regarded as software modules.

Viewed in abstract terms, these software modules initially relate to "types" or "templates" that are used, once or a number of times and at different points, by an "instantiation" in a software project, i.e., a database representing the automation solution at an upper level. Thus, different usage points can exist in an automation solution for a type or a template, which in automation engineering terminology are referred to as an instance of the type or of the template.

EP 2 575 034 A1 describes a method for proof of identity between a plurality of instance objects of an automation solution organized in a tree structure, on the one hand, and at least one type object, on the other hand.

So-called IO signals play a central role in industrial installations. In the present context, an "IO signal" is to be understood here as a digital (binary) or analog input or output channel of an IO assembly (for example, an "ET 200 SP HA" from Siemens) of an automation system, which are processed by assigned measurement points of individual measurement points.

A "measurement point" is to be understood here as a self-contained measurement system that has multiple IO signals which, where appropriate, comprise different signal types. Generally, the IO signals are planned and defined installation-wide in connection with the individual measurement points of the industrial installation. In this case, software planning tools are normally used to define so-called IO tags.

In the context of automation of an industrial installation, software-related and hardware-related aspects must be taken into consideration in connection with the IO signals. Signal processing programs are created using so-called engineering programs. So-called signal processing modules, also called channel drivers, are used in this case, and convert an input raw value of an IO signal into a standardized value (or vice versa in the case of a signal output).

Using hardware-related configuration tools, 10 modules for the automation of the industrial installation are configured as a function of the type of input or output channel (digital/analog) and the number of IO signals. For each individual IO signal, a measurement procedure used must be defined in the case of input channels or an output type in the case of output channels. Additionally, further parameters such as a measurement range or an output range, the performance of a wire-break test or of group diagnostics, as well as an input delay, must be parameterized.

Using the IO tags, a hardware-related and software-related assignment can be made, because for each IO signal a hardware address is specified and a symbolic name is defined for the software program. This means that a software-related signal processing module can be assigned a concrete on specific hardware-related input or output channel. This procedure is, however, very time-consuming and prone to error and furthermore must be performed anew for each configuration. Furthermore, the software-related and hardware-related data of an IO signal is at present detected and stored by separate programs. The resulting lack of clarity can significantly increase the frequency of errors during configuration.

Software generators are known, which automatically generate measurement points based on tables (in Excel format, for example). In this case, software-related and hardware-related parameters can generally also be defined. A disadvantage here is that when generating the tables close attention and a significant amount of time are needed. Even more significantly, prior to commissioning the industrial installation the opportunities for checking the consistency or plausibility of the defined parameters are insufficient.

SUMMARY OF THE INVENTION

It is an object of the invention to provide a control system for a technical installation and an associated data container that increase error-proofing during configuration of the technical installation.

This and other objects and advantages are achieved in accordance with the invention by a control system for controlling a technical installation, where the control system has an IO channel interface for reading out an IO signal from a separate device and/or for outputting an IO signal to the separate device. Furthermore, the control system has a computer-implemented data container (for integration of the IO signal into the control system). The data container has the following components: a first data object that comprises an abstract hardware-related configuration of the IO signal for the IO channel interface of the control system; a second data object comprises a concrete or specific hardware-related configuration of the IO signal with respect to an IO channel interface for the separate device; a third data object which comprises an abstract software-related configuration of the IO signal with respect to the IO channel interface of the control system; and a fourth data object which comprises a concrete or specific software-related configuration of the IO signal with respect to the IO channel interface of the device.

A device in this case is either a generator or receiver of one or more analog or binary signals. Examples of such devices are measuring transducers, binary sensors or control valves with a positioner. In the case of a technical installation, the so-called "field", the term "field devices" is used in this connection.

The abstract hardware-related configuration of the IO signal with respect to the IO channel interface of the control system may, in the case of an input signal, relate to parameters such as a measurement type or a measurement range. In the case of an output signal, it may relate to parameters such as an output type or an output range. The hardware-related configuration in this case is "abstract", by which is meant that the configuration does not relate to a particular device or similar, but has general applicability.

In the case of input signals, the abstract hardware-related configuration of the IO signal with respect to the IO channel interface typically contains channel-related hardware parameters such as a signal type (analog/digital), a measurement type (e.g., current 2-wire), a measurement range (e.g., 4-20 mA), the presence of a HART protocol (Yes/No). In the case of output signals, it may relate to hardware parameters such as an output type (current/voltage) or an output range (e.g. 4-20 mA).

Corresponding to this, the second data object comprises a concrete or specific hardware-related configuration in respect of the IO channel interface of the separate device (sensors or actuators, for example). The term "concrete" here means that the configuration relates to a particular device, in particular a field device, or a particular device type or to devices from a particular manufacturer.

The concrete or specific hardware-related configuration of the IO signal with respect to the IO channel interface of the separate device may relate to the same hardware parameters (possibly in a different notation) as for the abstract hardware-related configuration. Additional hardware parameters can also be included, however, such as for diagnostic functions (wire-break detection, diagnosis of overflow/underflow), or HART diagnostics.

The "concrete" hardware parameters are a mapping of the abstract hardware parameters, or a mapping rule exists that maps the abstract configuration to the concrete configuration.

The abstract software-related configuration of the IO signal with respect to the IO channel interface of the control system may relate to parameters such as a lower or upper scaling value of the IO signal, or a unit in the case of analog signals.

The concrete or specific software-related configuration of the IO signal with respect to the IO channel interface for the separate device may, for example, relate to a signal processing module or a signal processing program. A signal processing module is also called a channel driver and converts an input raw value of the IO signal into a standardized value (or vice versa in the case of an output signal).

It is an object of the invention to provide a data container for an IO signal for integration into a control system of a technical installation, where the control system has an IO channel interface for reading the IO signal out from a separate device and/or for outputting the IO signal to the separate device. The data container comprises, as already described above, the following data objects a first data object which comprises an abstract hardware-related configuration of the IO signal for the IO channel interface of the control system; a second data object which comprises a concrete on specific hardware-related configuration of the IO signal in respect of an IO channel interface for the separate device; a third data object which comprises an abstract software-related configuration of the IO signal in respect of the IO channel interface of the control system; and a fourth data object which comprises a concrete or specific software-related configuration of the IO signal in respect of the IO channel interface of the device.

It is a further object of the invention to provide a technical installation that comprises at least one measurement point, where the measurement point has a plurality of IO signals. Each IO signal is assigned a data container, which is formed or configured as explained above.

A "measurement point" is to be understood here as a self-contained measurement system that has multiple IO signals which, where appropriate, comprise different signal types. Generally, the IO signals are planned and defined installation-wide in connection with the individual measurement points of the industrial installation. In this case, software planning tools are normally used to define so-called IO tags.

It is also an object of the invention to provide a method for controlling a technical installation via a control system, where a data container configured in accordance with the disclosed embodiments is used to integrate IO signals and/or measurement points of the technical installation into the control system.

With the inventive embodiment of the control system or the provision and use of the inventive data container, an instance-specific parameterization of an IO signal is no longer necessary. Instead, ahead of a configuration of the technical installation, a comprehensive technical description of the IO signal and its integration into the control system is performed, which is then available during the actual configuration. As a result, the configuration becomes significantly more robust and less prone to errors. Another advantage is that in the case of a data container of a particular IO signal type, any changes made simply affect all IO signals of this type used later in the configuration, producing on the one hand a less complex and, on the other hand, an automatically consistently configuration. Furthermore, the configuration of the technical system is easy to validate with the help of the inventive data container. This aspect is in particular of great importance for technical installations where validation is mandatory (in the chemical or pharmaceutical sector, for example).

A consistency check on the configuration can advantageously be performed as follows. In a first step, a particular (IO) signal type can be compared to all measurement point types. This provides an overview as to which measurement point types or which differences exist compared to the original signal type. This comparison is particularly helpful for the validation, because it is easy to check whether the signal types/measurement point types are in a correct relationship to one another. In a second step, the actual comparison procedure is performed. Changes in the original IO signal type are taken over into the measurement point types in which the particular IO signal type is used. Finally, the changes in the measurement point types are also automatically taken over for all instantiated measurement points.

The same advantages also relate to the inventively configured technical installation having at least one measurement point, which has a plurality of IO signals that where appropriate have different types. With the disclosed embodiments of the invention, it is possible for the IO signals comprised by the measurement points, together with the embraced measurement point to be detected via a single type-based description prior to the configuration and, hence, to be easily integrated into the configuration or instantiated.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The above-described properties, features and advantages of this invention as well as the manner in which they are achieved will become clearer and more intelligible in conjunction with the following description of the exemplary embodiment which is explained in more detail with reference to the drawings, in which.

DETAILED DESCRIPTION OF THE EXEMPLARY EMBODIMENTS

Figure 1:
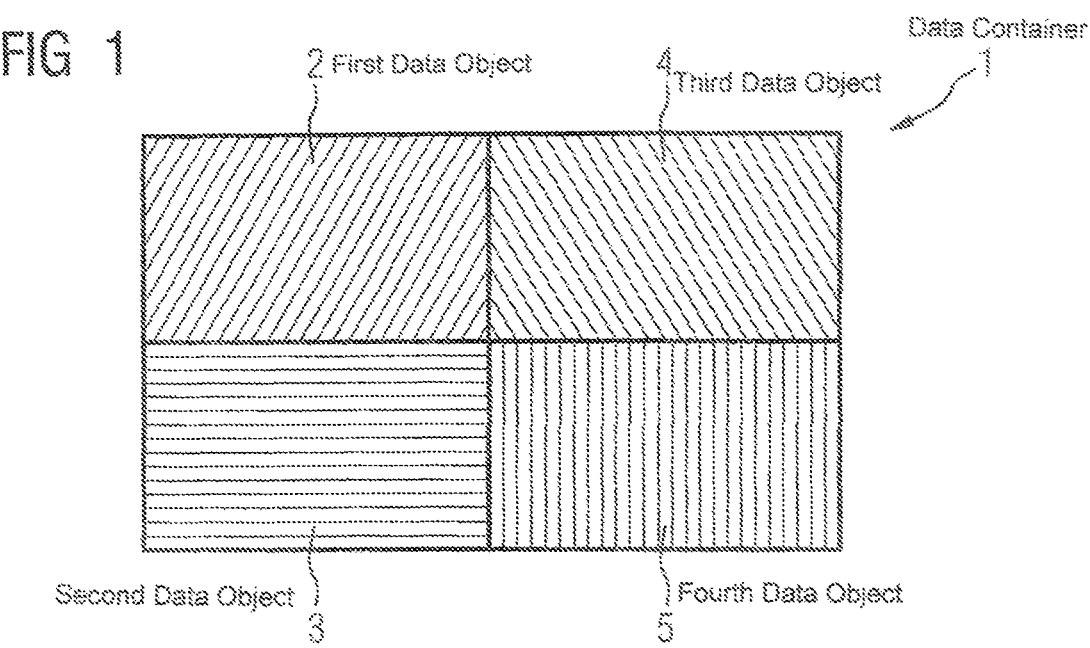
FIG. 1 is a schematic illustration of a data container for an IO signal of the type "temperature measurement" in accordance with the invention.

FIG. 1 shows an inventive data container 1 for an IO signal of the type "temperature measurement". The data container 1 comprises a first data object 2, a second data object 3, a third data object 4 and a fourth data object 5.

The first data object 2 comprises a hardware-related configuration of the IO signal for an IO channel interface (not shown) of a control system (not shown). The control system can, for example, be the process control system "PCS 7" from Siemens.

The IO signal can be an input signal for the control system, i.e., it is received by this via the IO channel interface. Alternatively, the IO signal can also be an output signal that is output by the IO channel interface of the control system. The hardware-related configuration can, for example, be a measurement type or a measurement range of the IO signal. Further examples are: "smoothing present", "data type", "channel signal type" or "limit value".

The second data object 3 comprises a hardware-related configuration of the IO signal with respect to an IO channel interface (not shown) of a separate device (not shown), i.e., different from the control system. The IO signal can here be an input signal for the separate device, i.e., it is received by it via its IO channel interface.

Alternatively, the IO signal can also be an output signal of the device that is output by the IO channel interface of the device. The hardware-related configuration can, for example, be a measurement type or a measurement range of the separate device.

The hardware-related configuration of the IO signal contained in the second data object 3 need not necessarily be different from the hardware-related configuration of the IO signal contained in the first data object 2. Instead, both can be partially or even completely identical.

The third data object 4 comprises an abstract software-related configuration of the IO signal with respect to the IO channel interface of the control system. The software-related configuration relates, for example, to attributes such as "unit", "scaling values" or "variable type". Essentially, this relates to a technological description of the IO signal, e.g., temperature measured in degrees Celsius.

The fourth data object 5 comprises a concrete, e.g., manufacturer-dependent software-related configuration of the IO signal with respect to the IO channel interface of the device. Here, the concrete or specific software-related configuration comprises a channel driver module.

The channel driver module, also called a channel module, is provided device-dependently in a software library of the control system and is used for programming the signal conversion (raw value into standardized value for input signals or vice versa for output signals). Typically, the standardized value is connected up on the channel module with the process value input or output of a so-called technological module (motor module, valve module or controller module, etc.).

Figure 2:
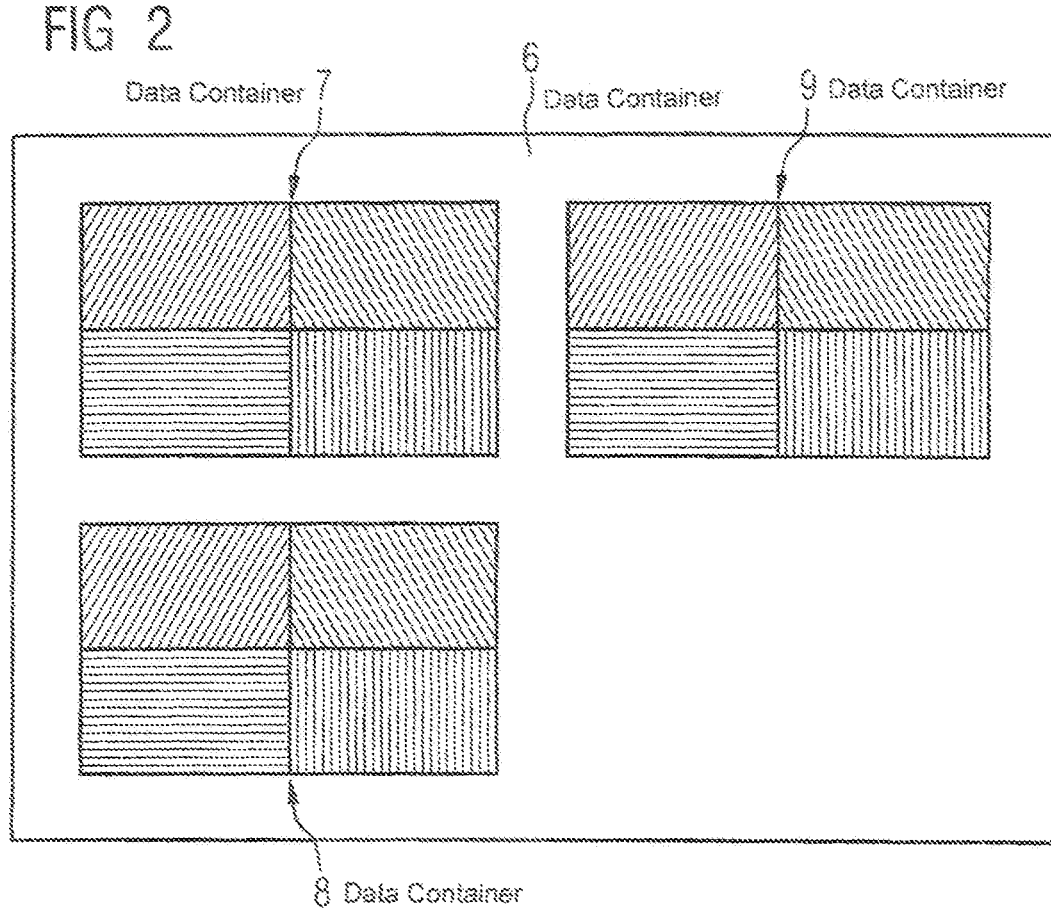
FIG. 2 is a schematic illustration of a data container of a measurement point of the type "valve controller" in accordance with the invention.

FIG. 2 shows a data container 6 of a measurement point of the type "valve controller". The measurement point has two IO signals formed or provided as input signals and one IO signal formed or provided as an output signal. Analogously, three data containers 7, 8, 9 are shown in FIG. 2, which in turn are part of the data container 6 of the measurement point. The two data containers 7, 8 shown on the left-hand side are assigned to the two input signal containers and have the type "feedback valve opened" or "feedback valve closed". The right-hand data container 9 is assigned to the output signal container and has the type "control output valve" ("control").

Figure 3:
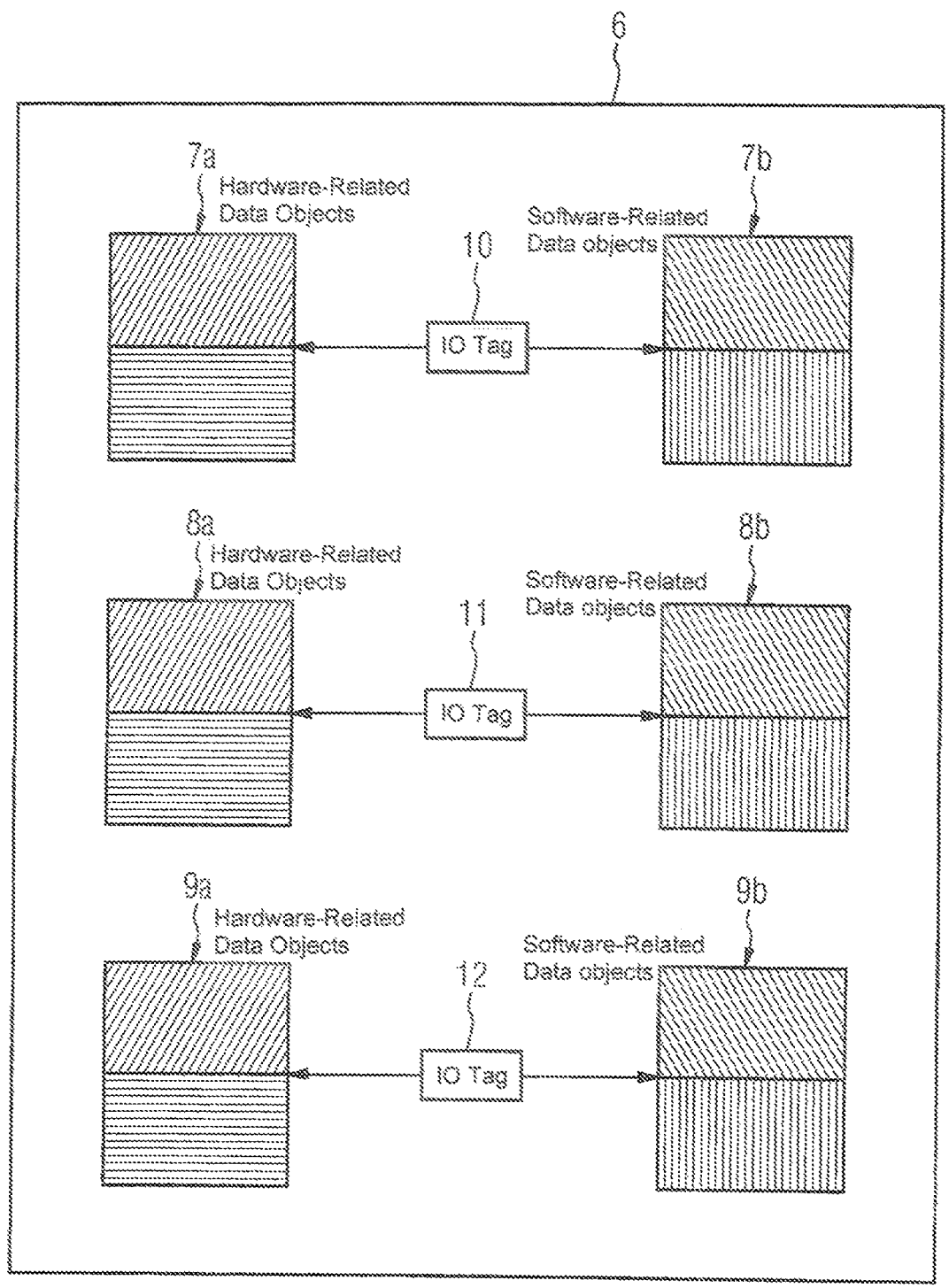
FIG. 3 is a schematic illustration of how the individual hardware-related data objects of three IO signal types integrated in the measurement point are connected to individual software-related data objects via IO tags in accordance with the invention.

With the use of inventive data containers 7, 8, 9, a consistency check on the already instantiated measurement points (measurement point types) can easily be performed. To this end, FIG. 3 makes clear how the individual hardware-related data objects 7a, 8a, 9a of the three IO signal types integrated in the measurement point are connected to the individual software-related data objects 7b, 8b, 9b via so-called IO tags 10, 11, 12.

The consistency check includes both the hardware aspect (hardware-related data objects 7a, 8a, 9a) and the software aspect (software-related data objects 7b, 8b, 9b). Here, the coherence between the hardware aspect and software aspect is determined with the help of the IO tags 10, 11, 12. The IO tags 10, 11, 12 contain a reference to the concrete or specific hardware channel of a device and a reference to the concrete software-related signal input or output of the device. The consistency check on a measurement point type takes into account all included signal instances with the aspects of software and hardware, because with the help of the IO tags 10, 11, 12 the respective data objects 7a, 8a, 9a, 7b, 8b, 9b are determined and are contrasted in a comparison.

Figure 4:
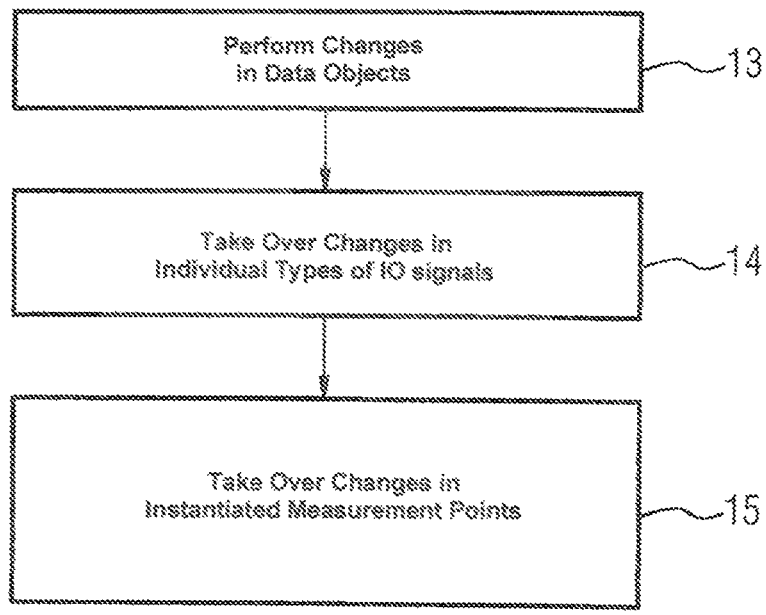
FIG. 4 shows a sequence of a consistent configuration of a measurement point of a technical installation in a control system of the technical installation in accordance with the invention.

FIG. 4 shows a sequence of a consistent configuration of a measurement point of a technical installation in a control system of the technical installation. In a first step 13, different types of IO signals that can be used in the technical installation are defined and corresponding data containers 1 are created. These data containers 1 are then in a second step 14, integrated into a data container 6 of a measurement point, depending on which types of IO signals should be contained in the measurement point. In a third step 15 the previously created data containers 6 of the measurement point are used in the context of the actual configuration for the so-called instantiation of the measurement point. Here, the assigned IO tags 10, 11, 12 are assigned to the instantiated measurement points.

Figure 5:
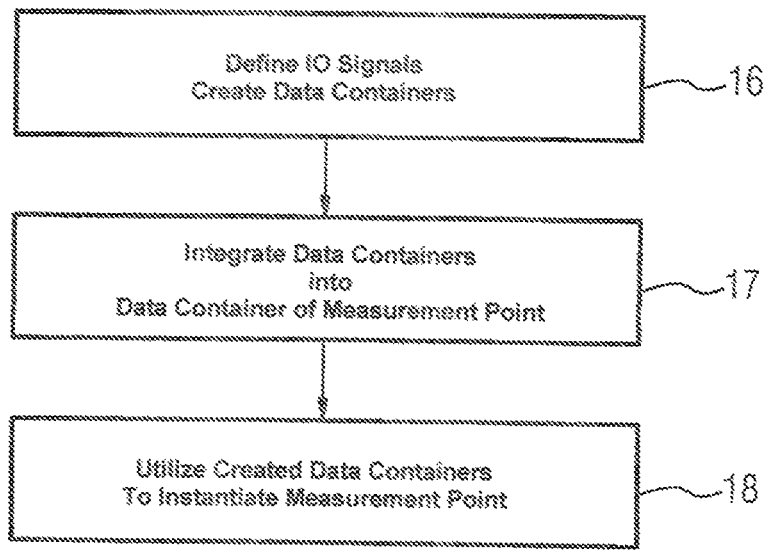
FIG. 5 shows a sequence of how changes are made to parameters of the individual types of IO signals in accordance with the invention.

FIG. 5 shows how changes are made to parameters of the individual types of IO signals. In a first step 16, the actual changes are made in the hardware-related and/or software-related configurations of the individual data objects 2, 3, 4, 5. The changes made in the individual (master) types of the IO signals are, in a second step 17, automatically taken over in the (master) measurement points (measurement point types), in whose data containers 6 the changed data containers 1 are contained. In a third step 18, the changes are then automatically taken over in the instantiated measurement points.

Figure 6:
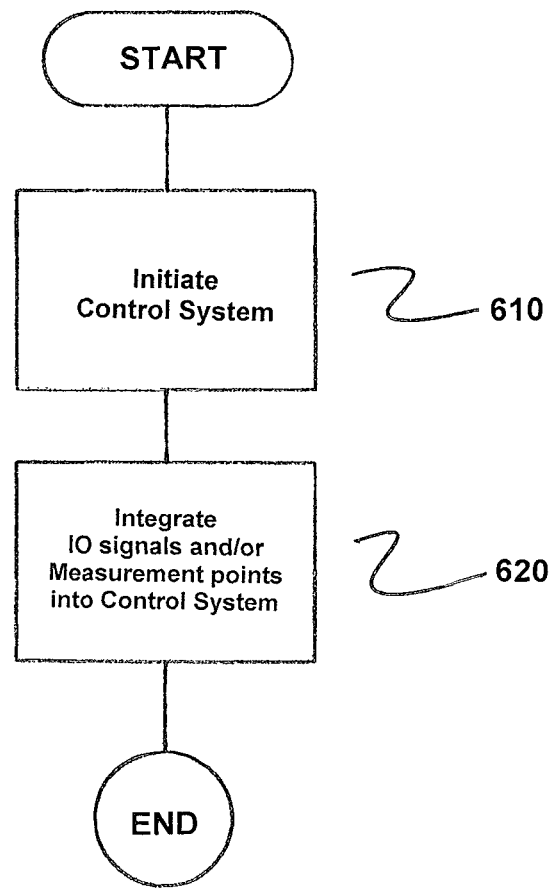
FIG. 6 is a flowchart of the method in accordance with the invention.

FIG. 6 is a flowchart of the method for controlling a technical installation via a control system. The method comprises initiating the control system, as indicated in step 610. Next, either the IO signals of the technical installation are integrated into the control system and/or the measurement points of the technical installation are integrated into the control system, as indicated in step 620.

Although the invention has been illustrated and described in detail using the preferred exemplary embodiment, the invention is not limited by the disclosed examples, and a person skilled in the art can derive other variations therefrom without departing from the scope of protection of the invention.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A control system for controlling a technical installation, said control system having an IO channel interface for at least one of (i) reading out an IO signal from a separate device and (ii) outputting an IO signal to the separate device, a computer-implemented data container being included in said separate device, said data container comprising:
    a first data object which comprises an abstract hardware-related configuration of the IO signal with respect to the IO channel interface of the control system;
    a second data object which comprises a specific hardware-related configuration of the IO signal with respect to an IO channel interface for the separate device;
    a third data object which comprises an abstract software-related configuration of the IO signal with respect to the IO channel interface of the control system; and
    a fourth data object which comprises a specific software-related configuration of the IO signal with respect to the IO channel interface for the separate device;
    wherein the control system is configured to:
        perform a consistency check by comparing individual hardware-related data objects and individual software-related data objects via IO tags to determine a coherence between the individual hardware-related data objects and the individual software-related data objects.

2. A data container for an IO signal, said data container being integrated into a control system of a technical installation, the control system having an IO channel interface for at least one of (i) reading out the IO signal from a separate device and (ii) outputting the IO signal to a separate device, said data container comprising:
    a first data object which comprises an abstract hardware-related configuration of the IO signal with respect to the IO channel interface of the control system;
    a second data object which comprises a specific hardware-related configuration of the IO signal with respect to an IO channel interface for the separate device;
    a third data object which comprises an abstract software-related configuration of the IO signal with respect to the IO channel interface of the control system; and
    a fourth data object which comprises a specific software-related configuration of the IO signal with respect to the IO channel interface for the separate device;
    wherein the control system is configured to:
        perform a consistency check by comparing individual hardware-related data objects and individual software-related data objects via IO tags to determine a coherence between the individual hardware-related data objects and the individual software-related data objects.

3. A technical installation having at least one measurement point, the measurement point having a plurality of IO signals, to which a respective data container as claimed in claim 2 is assigned in the control system of the technical installation.

4. A method for controlling a technical installation via a control system, a data container for an IO signal integrating the control system of the technical installation, the control system having an IO channel interface for at least one of (i) reading out the IO signal from a separate device and (ii) outputting the IO signal to a separate device, the data container comprising a first data object which comprises an abstract hardware-related configuration of the IO signal with respect to the IO channel interface of the control system, a second data object which comprises a specific hardware-related configuration of the IO signal with respect to an IO channel interface for the separate device, a third data object which comprises an abstract software-related configuration of the IO signal with respect to the IO channel interface of the control system, and a fourth data object which comprises a specific software-related configuration of the IO signal with respect to the IO channel interface for the separate device, the method comprising:
    initiating the control system;
    integrating at least one of (i) IO signals of the technical installation into the control system and (ii) measurement points of the technical installation into the control system; and
    performing a consistency check by comparing individual hardware-related data objects and individual software-related data objects via IO tags to determine a coherence between the individual hardware-related data objects and the individual software-related data objects.

* * * * *